United States Patent Office
2,885,383
Patented May 5, 1959

2,885,383

REACTION PRODUCT OF VINYLTRICHLOROSIL-
ANE, DIETHYLENE GLYCOL, WATER AND AM-
MONIA OR AN AMINE AND METHOD OF MAK-
ING SAME

Marvin C. Brooks, Middlebury, Conn., assignor to United
States Rubber Company, New York, N.Y., a corpora-
tion of New Jersey No Drawing. Application October 5, 1955
Serial No. 538,771

5 Claims. (Cl. 260—45.4)

This invention relates to the manufacture of composite structures of glass and resin, in which the bonding of the resin to the glass is particularly strong. More specifically, the invention relates to the preparation and use of a substance for improving the bond between the resin and the glass, which substance is obtained by modifying or "activating," with small quantities of water and ammonia or an amine, a reaction product of vinyltrichlorosilane with diethylene glycol.

It has previously been found (see my U.S. Patent 2,754,-237, issued July 10, 1956, and my copending application Serial No. 392,480, filed November 16, 1953) that when glass is pretreated by depositing on it a very thin surface coating of certain vinylsilane chemicals (including the above mentioned vinyltrichlorosilane-diethylene glycol reaction product in the unactivated condition), the composite glass-resin structure made from such a treated glass has greater strength, and is more resistant to loss of strength when exposed to moisture, than a similar structure made with clean untreated glass. It has also been found (see my abandoned application Serial No. 343,505, filed March 19, 1953, which is a continuation-in-part of my abandoned application Serial No. 306,723, filed August 27, 1952) that a similar improvement may be obtained by using clean untreated glass and an uncured resin mixture containing a properly selected vinylsilane chemical in making the glass-resin structure. This second method has obvious advantages of simplicity, flexibility, and economy over the first method.

The above-mentioned unactivated vinyltrichlorosilane-diethylene glycol reaction product is effective in increasing the strength of a glass-resin structure made by this second method, as shown, e.g., by Example II of my above-mentioned application Serial No. 343,505. However, the extent of the improvement obtained is found to be somewhat variable, and in particular to be less for resin mixtures which cure at a relatively low temperature and a relatively rapid rate than for mixtures which cure less rapidly. It has now been found that, if the vinyltrichlorosilane-diethylene glycol reaction product is "activated" in a certain novel manner before incorporating it in the resin in carrying out the second method, more consistent improvement is obtained under widely varying curing conditions. According to the invention, the novel "activation" involves causing the reaction product to react with small quantities of water and ammonia or an amine, as will be described in detail below. The practice of this invention will be made clear by means of a description of the following items:

(1) Preparation of the vinyltrichlorosilane-diethylene glycol reaction product.
(2) Activation of this reaction product by reacting it with water and ammonia or amine.
(3) Incorporation of the activated reaction product into a liquid curable resinous mixture containing an ethylenic monomeric compound and a free-radical generating catalyst.
(4) Curing the mixture from step (3) in contact with glass.

These items are described in detail in the following:

(1) *Preparation of reaction product.*—225 grams (2.12 moles) of diethylene glycol are placed in a vessel and 150 grams (0.93 mole) of vinyltrichlorosilane are added at room temperature with stirring. During addition of the silane, hydrogen chloride is evolved. The reaction mixture is then heated to 200° C. and held at this temperature for 2–3 hours, to complete the reaction and drive off the hydrogen chloride. The final product contains essentially no hydrolyzable chloride.

This example uses 4.25 equivalents of diethylene glycol (1 equivalent being the weight which contains one gram molecular weight of hydroxyl), and 2.8 equivalents of vinyltrichlorosilane (1 equivalent being the weight which contains 1 gram atomic weight of chlorine), or about 1.5 equivalents of glycol to 1.0 equivalent of silane. These proportions may be varied to some extent, but should be within the limits 1.3 to 1.8 equivalents of glycol per equivalent of silane, and preferably within the limits 1.5 to 1.8 equivalents of glycol per equivalent of silane. Smaller proportions of glycol may result in insoluble gelled products, while larger proportions unnecessarily dilute the product. For further details on the preparation of the vinyltrichlorosilane-diethylene glycol reaction product, reference may be had to U.S. Patent 2,715,135, issued August 9, 1955, to M. C. Brooks and R. H. Ewart, the disclosure of which is hereby incorporated herein by reference.

(2) *Activation of reaction product.*—The water and the ammonia or the amine (either concurrently or successively in any desired order) are slowly added to the reaction product with constant stirring, so as to insure rapid and complete mixing. Stirring is continued until an exothermic reaction occurs; this causes a temperature rise of about 10–20° C., and is usually complete in about five minutes. The activated product is ready for use as soon as, but not before, the exothermic reaction is completed. The activated product will keep indefinitely in a closed container; exposure to moist air causes a film of gelled material to form at the surface.

If mixing is not rapid enough, or if amounts of water greater than about 4% are added, gelation will occur. The preferred amount of water to be used is 2–3%, based on the reaction product, and in any case I almost invariably use at least 0.5% of water. Water alone reacts very slowly, if at all, with the reaction product at room temperature; the ammonia or the amine serves to speed up the reaction, and may also itself enter into the reaction. The preferred amine for some applications is dimethylamine, since it, unlike the other amines tested, does not have a discoloring effect on the final cured polyester resin. However, other amines work—insofar as their activating effect is concerned—as well as, and in some cases perhaps even better than dimethylamine. Among the materials tested and found effective are ammonia, monoethanolamine, diethanolamine, triethanolamine, dimethylamine, ethylamine, amylamine, triethylenetetramine. The preferred amount of material varies somewhat with the material chosen. The amount is kept to a minimum, to avoid discoloration of the resin and the activating effect on the cure of the resin. Amounts of ammonia or amine from 0.1% to 5% on the resin have been used, and in general I almost invariably use at least 0.05% of the ammonia or amine, but not usually in excess of 10% of the same.

The activated reaction product closely resembles the unactivated product in physical properties, being a liquid of light brown color, with a viscosity in the range 100 to 1000 centipoises. The viscosity depends mainly on the equivalent ratio of glycol to silane, being very high for ratios below 1.3 to 1, and decreasing rapidly as the ratio is increased above 1.3 to 1.

Using the method of this invention, attempts have been made to activate other reaction products of vinyltrichlorosilane with mono- and dihydric alcohols, including the following:

Vinyltriethoxysilane
Vinyltri-2-chloroethoxysilane
Reaction product of vinyltricholorosilane and propylene glycol
Reaction product of vinyltrichlorosilane and 2,4-pentanediol
Reaction product of vinyltrichlorosilane and 2,4-ethylene glycol
Reaction product of vinyltrichlorosilane and 2,4-dipropylene glycol
Reaction product of vinyltrichlorosilane and 2,4-triethylene glycol Unexpectedly, none of these are found to be activated as is the diethylene glycol reaction product, although they appear to undergo a similar reaction when treated with water and amine.

(3) *Mixing activated reaction product with resin-forming liquid.*—The activated reaction product is preferably mixed with the liquid mixture of the resin-forming constituents just before the cure is started; it is convenient to add the activated product at the same time as the cure catalyst is added. Prolonged standing after adding the activated product must be avoided, since the beneficial effects of the addition are lost. Standing periods up to one day may be tolerated in some cases without serious loss of beneficial effect; however, it is preferable to bring the mixture into contact with the glass as promptly as possible after adding the activated reaction product, and to cure the mixture at once.

(4) *Molding and curing.*—The liquid resin-forming mixture containing the catalyst and the activated reaction product of this invention is brought into contact with the glass portion of the desired composite structure, and kept there during the curing process, using if necessary a suitably designed mold, as is well-known in the art.

The following explanation of the improved results obtained with the activated reaction product is offered, without however intending to limit the claims for invention by any such explanation. It is believed that the reaction product or additive acts by migrating to the glass surface and becoming attached to it, either by adsorptive forces or more probably by chemical reaction between the additive and surface constituents of the glass, before the cure starts. The vinyl group of the additive subsequently, during cure of the resin, copolymerizes with the resin-forming constituents, and is incorporated into the resin structure, thus providing a chemical bond between resin and glass. If the vinyl group copolymerizes with the resin-forming constituents before the additive reaches and becomes attached to the glass surface, no bond between resin and glass is obtained. The improved results obtained with the activated reaction product as compared with those obtained with the unactivated reaction product are believed to be due to a faster rate of one or both of the steps involved in adhering the additive to the glass, i.e. migration of the additive to the glass surface, and reaction of the additive with the glass surface.

*Resins.*—The curable resinous compositions with which the activated vinyltrichlorosilane-diethylene glycol reaction product is admixed in accordance with the invention are well-known materials and comprise a polymerization catalyst, typically an organic peroxide, an esterification product of an alpha-ethylenic alpha, beta-dicarboxylic acid with a glycol, this esterification product being an advanced linear polyester containing unesterified carboxyl groups and having an acid number of from 5 to 100 and being dissolved in and copolymerizable with a liquid monomeric unsaturated polymerizable compound containing an ethylenic linkage and being immiscible with water. Polyesters of this type are described in U.S. Patent 2,195,362. In use, unsaturated linear polyesters of this type are mixed with a polymerizable monomer, for instance, styrene, diallyl phthalate or triallyl cyanurate, and the mixture is cured to solid form by heating in the presence of a suitable catalyst. Typical unsaturated linear polyestercopolymerizable monomer resin mixes used in practicing the invention are described in U.S. Patent 2,255,313 and in British Patents 540,168 and 540,169. As descriptive of such mixes, the disclosure of said patents is hereby incorporated by reference in order to avoid undue repetition. As is well-known, the unsaturated dicarboxylic acid may be partially replaced by another dibasic acid which may be typified by adipic acid, succinic acid, sebacic acid, phthalic acid, tetrachlorophthalic anhydride, and which may be used in amounts up to 3 moles per mole of unsaturated dicarboxylic acid.

Reference may be had to my previously mentioned abandoned application Serial No. 343,505 for further details concerning the incorporation of the vinyltrichlorosilane-diethylene glycol additive in the resin composition, as well as for further details concerning the formulation and curing of the resin composition, since the details there disclosed concerning suitable materials, proportions, curing conditions, etc., apply to the present invention also, the only difference being that in the present case the additive is modified with water and an amine as herein described. Thus, as disclosed in said abandoned application, the amount of the vinyltrichlorosilane reaction product added to the resin will generally range from 0.1 to 10% of the weights of the esterification product and monomer.

*Glass.*—The glass used in the composite structure to which the invention is applicable may be in any desired form. The invention is especially useful in making structures containing glass fibers, whether the fibers be present as individual fibers, or as components of a yarn, cord, or fabric. In any case, the surface of the glass should be clean, i.e. it should be free from any extraneous material which would adversely affect the bonding of the resin thereto. In particular, it should be free from organic material which would adversely affect the degree of bonding, especially those organic materials which are applied to glass fiber during manufacture for various purposes such as for libricating the fibers or sizing them. The maximum effectiveness of the reaction products is obtained when well cleaned glass fibers are used. If a sizing has been applied to glass fibers it may be removed by heating them to temperatures within the range of 600 to 900° F. for say 12 to 72 hours before bringing them into contact with the resin-reaction product mixture.

*Testing methods.*—In demonstrating the effect of the invention on glass fiber-reinforced polyester compositions, we have chosen to report the flexural strength of molded flat sheets of the compositions. It is well-known to those experienced in the field that changes in tensile strength and compressive strength generally parallel changes in flexural strength.

The most significant improvement in the reinforced polyester compositions brought about by the method of the invention is greater strength retention after aging in water. As is common practice among those experienced in the field, we have measured this property by determining the flexural strength of the compositions after they have been immersed in boiling water for 3 hours. This aging treatment is generally recognized to be at least equivalent to standing one month in water at room temperature.

The samples used for testing were laminates constructed with 12 plies of glass fabric which had been cleaned by heating for 48 hours at 750° F. The glass fabric was thoroughly saturated with resin, care being taken to remove all air bubbles. The laminates were then cured in molds at atmospheric pressure, or in a laboratory press at approximately 15 p.s.i. pressure. The curing cycle varied. Thickness of the cured laminates was about ⅛ inch, and the glass content was about 65% by weight.

*Examples.*—In the following additional examples illustrative of the invention, two resin-forming mixtures were used, as described below.

*Resin mixture A.*—98 parts of maleic anhydride, 148 parts of phthalic anhydride, and 163 parts of propylene glycol are heated for 3 hours at 200° C., the final half-hour being at reduced pressure. The resultant alkyd resin has an acid number of 55. Resin mixture A consists of 67 parts of this alkyd and 33 parts of styrene.

*Resin mixture B.*—88 parts of maleic anhydride, 148 parts of phthalic anhydride, 29 parts of tetrachloro phthalic anhydride, and 130 parts of ethylene glycol are heated about 4 hours at 220° C. The alkyd so prepared has an acid number of 40. Resin mixture B is a combination of 70 parts of this alkyd and 30 parts of styrene.

*Example 1.*—Three series of laminates were made, using as activator various amounts of three different amines and of water, other factors being the same for all experiments, namely:

Resin A was used.

1% of reaction product (or activated reaction product) on the resin was used.

2% of methyl ethyl ketone peroxide and 0.15% cobalt naphthenate on the resin were used as catalyst.

Cured 24 hours at room temperature, following by 1 hour post-cure at 212° F.

Results are shown in the table below:

| Activator (as percent of reaction product) | Green Flexural Strength (p.s.i.) | Flexural Strength After 3 hr. Boil (p.s.i.) |
| --- | --- | --- |
| None | 66,800 | 46,700 |
| 0.5% ethanolamine + 0.5% water | 70,800 | 50,000 |
| 1% ethanolamine + 1% water | 72,200 | 56,300 |
| 2% ethanolamine + 2% water | 71,000 | 60,100 |
| None | 66,000 | 44,500 |
| 0.28% ammonia + 0.72% water | 68,100 | 49,600 |
| 0.56% ammonia + 1.44% water | 75,300 | 54,900 |
| 1.12% ammonia + 2.88% water | 73,900 | 58,500 |
| None | 66,000 | 44,500 |
| 0.4% Dimethylamine + 0.6% water | 70,200 | 51,800 |
| 0.8% Dimethylamine + 1.2% water | 66,800 | 52,500 |
| 1.6% Dimethylamine + 2.4% water | 70,800 | 56,300 |

Comparing the samples containing activated reaction product with those containing unactivated reaction product, it will be observed that the activator had a definite beneficial effect in improving even the green flexural strength, and a marked beneficial effect in improving the flexural strength after exposure to moisture.

*Example 2.*—In this example, the amount of water in the activator was varied with constant amine content, other factors being as in Example 1.

| Activator (as percent of reaction product) | Green Flexural Strength (p.s.i.) | Flexural Strength After 3 hr. Boil (p.s.i.) |
| --- | --- | --- |
| 2% Ethanolamine (no water) | 62,000 | 45,300 |
| 2% Ethanolamine + 2% H₂O | 63,000 | 53,800 |
| 0.2% Dimethylamine + 0.8% H₂O | 64,900 | 50,200 |
| 0.2% Dimethylamine + 1.3% H₂O | 66,500 | 53,400 |
| 0.2% Dimethylamine + 2.3% H₂O | 68,400 | 54,900 |
| 0.4% Dimethylamine + 1.1% H₂O | 66,000 | 52,300 |
| 0.4% Dimethylamine + 2.2% H₂O | 64,800 | 51,800 |
| 0.4% Dimethylamine + 3.2% H₂O | 65,600 | 56,700 |
| 0.8% Dimethylamine + 1.7% H₂O | 63,900 | 53,100 |
| 0.8% Dimethylamine + 2.2% H₂O | 63,400 | 53,700 |
| 0.8% Dimethylamine + 3.2% H₂O | 67,800 | 57,200 |

The importance of water as an activator is clearly shown by the enhancement of flexural strength as the water is increased, particularly in the boiled samples.

*Example 3.*—In the experiments of this example, three different catalysts and three corresponding curing conditions were used as follows:

*Cure I.*—2% methyl ethyl ketone peroxide+0.15% cobalt naphthenate on the resin. Cured 24 hours at room temperature, followed by 1 hour at 212° F.

*Cure II.*—1.5% benzoyl peroxide on the resin. Cured 20 minutes at 175° F.+15 min. rise to 275° F.+10 min. at 275° F.

*Cure III.*—1% ditertiarybutyl diperphthalate on the resin. Cured 20 min. at 200° F.+15 min. rise to 300° F.+10 min. at 300° F.

Using each cure, samples containing 1% of plain (unactivated) reaction product and samples containing 1% of reaction product activated with .4% dimethylamine and 2.6% water were made. Resin A was used in all samples.

| Reaction Product Used | Cure | Green Flexural Strength (p.s.i.) | Flexural Strength after 3 Hr. Boil (p.s.i.) |
| --- | --- | --- | --- |
| Plain | I | 66,800 | 47,200 |
| Activated | I | 65,600 | 56,700 |
| Plain | II | 63,600 | 46,800 |
| Activated | II | 60,900 | 52,200 |
| Plain | III | 72,100 | 58,900 |
| Activated | III | 67,500 | 63,000 |

The superiority of the activated over the unactivated reaction product is clearly shown by comparing the flexural strength of the boiled samples, particularly those made with the more active curing agents.

*Example 4.*—This example shows the applicability of the invention to two different resins, using two different curing conditions (cure I and cure II of Example 3), and using 1% of the activated addition product of Example 3.

| Resin | Cure | Green Flexural Strength (p.s.i.) | Flexural Strength after 3 hr. Boil (p.s.i.) |
| --- | --- | --- | --- |
| Resin A | I | 65,500 | 53,000 |
| Resin B | I | 67,400 | 57,600 |
| Resin A | II | 60,900 | 52,200 |
| Resin B | II | 68,700 | 58,000 |

*Example 5.*—This example shows the relative ineffectiveness of the activation method of the invention when applied to vinylsilanes other than the vinyltrichlorosilane-diethylene glycol reaction product of the present invention. The vinylsilanes were prepared in a manner similar to that described above for the reaction product of the present invention, using vinyltrichlorosilane and various alcohols and diols. The table below shows the alcohol or diol used in making the reaction product and the amount of reaction product on the resin; the kind and amount of activator used; and the results of strength tests on samples cured as in cure I of Example 3. Resin A was used.

| Activator | Green Flexural Strength (p.s.i.) | Flex. Strength Aft. 3 hr. Boil (p.s.i.) |
| --- | --- | --- |
| 1% of 2-chloroethanol react. prod. | | |
| none | 69,200 | 52,100 |
| 0.8% dimethylamine+1.2% H₂O | 64,700 | 46,500 |
| 1.6% dimethylamine+2.4% H₂O | 64,800 | 43,700 |
| 1% of propylene glycol react. prod. | | |
| none | 59,000 | 38,000 |
| 2% ethanolamine+ H₂O | 63,000 | 38,400 |

| 1% of 2,4-pentanediol react. prod. | | |
|---|---|---|
| none | 65,500 | 43,800 |
| 2% ethanolamine+2% H₂O | 66,300 | 34,300 |

| 1% of ethylene glycol react. prod. | | |
|---|---|---|
| none | 59,800 | 38,700 |
| 2% ethanolamine+2% H₂O | 56,400 | 32,000 |

| 2% of dipropylene glycol react. prod. | | |
|---|---|---|
| none | 63,400 | 30,900 |
| 0.3% dimethylamine+2.7% H₂O | 63,500 | 30,800 |

| 2% of triethylene glycol react. prod. | | |
|---|---|---|
| none | 55,300 | 31,700 |
| 0.3% dimethylamine+2.7% H₂O | 60,700 | 34,000 |

*Example 6.*—This example illustrates the loss of effectiveness encountered when the resin mixture containing the activated reaction product is stored before use. A batch of resin mixture A containing neither catalyst nor activated reaction product was divided into three parts. To one of these parts (test resin 1) there was added at the start of the experiment 1% of activated reaction product; to a second part (test resin 2) 2% of activated reaction product was added at the start; to the third part (control resin) no reaction product was added at the start. After storage for various periods at room temperature, catalyst was added to portions of test resins 1 and 2, and catalyst and 1% of activated reaction product were added to the control resin; the portions were then cured using cure I of Example 3, and the resulting samples tested. Results are shown in the table below.

| Days/Aging of Storage/ Sample | Flexural Strength Tests (p.s.i.) | | |
|---|---|---|---|
| | Test Resin #1 (1% react. prod. during storage) | Test Resin #2 (2% react. prod. during storage) | Control Resin (1% react. prod. just before cure) |
| 0—Green | 68,500 | 68,300 | 68,600 |
| 0—Boiled | 51,900 | 51,900 | 51,600 |
| 5—Green | 70,900 | 66,800 | 67,900 |
| 5—Boiled | 41,700 | 46,000 | 55,800 |
| 8—Green | 63,700 | 67,100 | 64,700 |
| 8—Boiled | 39,600 | 41,600 | 52,700 |
| 12—Green | 65,200 | 64,200 | 65,800 |
| 12—Boiled | 33,300 | 37,800 | 51,700 |

It will be seen that, while the green samples show no significant differences between the different treatments, the reaction product is ineffective in maintaining strength in the boiled product when it is added 5 days or more before cure.

Having thus described my invention, what I claim and desire to protect by Letters Patent is:

1. A composition useful for improving bonding of resin to glass comprising a reaction product of 1 equivalent of vinyltrichlorosilane with from 1.3 to 1.8 equivalents of diethylene glycol modified with from 0.5 to 4% of water and from 0.05 to 10% of a material selected from the group consisting of ammonia and aliphatic amines.

2. A composition as in claim 1 in which the amine is dimethylamine.

3. A method of modifying a reaction product of 1 equivalent of vinyltrichlorosilane with from 1.3 to 1.8 equivalents of diethylene glycol, which comprises reacting said reaction product with from 0.5 to 4% of water and from 0.05 to 10% of a material selected from the group consisting of ammonia and aliphatic amines.

4. A method comprising mixing the reaction product of 1 equivalent of vinyltrichlorosilane with from 1.3 to 1.8 equivalents of diethylene glycol modified with from 0.5 to 4% of water and from 0.05 to 10% of a material selected from the group consisting of ammonia and aliphatic amines with a curable polyester resin composition comprising an organic peroxide polymerization catalyst, and esterification product of an alpha-ethylenic alpha, beta-dicarboxylic acid with a glycol, said esterification product being a linear polyester containing unesterified carboxyl groups and having an acid number of from 5 to 100, and a liquid miscible with and copolymerizable with said esterification product to yield a solid resinous material, which liquid is a monomeric unsaturated polymerizable compound containing an ethylenic linkage, the amount of said reaction product being equal to from 0.1 to 10% of the weights of said esterification product and monomer, and therafter curing said polyester resin composition in contact with a clean glass surface, whereby a strong adhesive bond is formed between the glass and the resin.

5. The product of the method of claim 4.

References Cited in the file of this patent

UNITED STATES PATENTS

| 2,715,135 | Brooks et al. | Aug. 9, 1955 |
| 2,798,020 | Balz et al. | July 2, 1957 |

FOREIGN PATENTS

| 575,752 | Great Britain | Mar. 4, 1956 |

OTHER REFERENCES

Bjorksten et al.: "Modern Plastics," volume 29, No. 11, July 1952, pages 124 and 188.